United States Patent [19]

Buglewicz

[11] 3,812,451

[45] May 21, 1974

[54] SANDWICH CONNECTOR PLUG

[76] Inventor: Neal J. Buglewicz, 12 Empty Saddle Rd., Rolling Hills Estates, Calif. 90274

[22] Filed: Oct. 30, 1972

[21] Appl. No.: 302,068

[52] U.S. Cl. ....... 339/155 R, 339/156 R, 339/166 R

[51] Int. Cl. .............................................. H01r 13/50

[58] Field of Search..... 179/1 PC; 339/31, 153–157, 339/163, 166, 170, 173

[56] References Cited

UNITED STATES PATENTS

| | | | |
|---|---|---|---|
| 1,959,895 | 5/1934 | Bayliss | 339/155 R |
| 2,098,771 | 11/1937 | Bogue | 339/155 R X |
| 1,864,353 | 6/1932 | Hubbell | 339/155 R |
| 2,007,848 | 7/1935 | Cromartie | 339/155 R |
| 2,484,092 | 10/1949 | Hopgood | 339/155 R X |
| 3,668,324 | 6/1972 | Firestone | 179/1 PC |

FOREIGN PATENTS OR APPLICATIONS

| | | | |
|---|---|---|---|
| 1,461,897 | 11/1966 | France | 339/153 |

*Primary Examiner*—Bobby R. Gay
*Assistant Examiner*—Lawrence J. Staab
*Attorney, Agent, or Firm*—William R. Lane

[57] ABSTRACT

A sandwich plug for use in a telephone installation for connecting an automatic dialing mechanism in series with the telephone line.

3 Claims, 6 Drawing Figures

PATENTED MAY 21 1974

3,812,451

SANDWICH CONNECTOR PLUG

BACKGROUND OF THE INVENTION

The invention relates to an arrangement for connecting an automatic dialing mechanism in series with a telephone line without disturbing the wiring installations made by the telephone company.

PRIOR ART

Sandwich blocks are known which are placed in a telephone line for connecting a second telephone in parallel with the telephone line. A plug of this type is described in U.S. Pat. No. 3,660,797. Such plugs, however, are not capable of connecting a device such as an automatic dialing arrangement in series in the telephone line to permit such automatic dialing arrangements to be selectively used without disturbing the normal operation of the telephone.

STATEMENT OF THE INVENTION

The invention comprises a sandwich plug for use in a telephone line installation which can be placed into the telephone line without disturbing the wiring installations of the telephone company and yet provide a connection whereby a mechanism such as an automatic dialing arrangement can be connected in series with the telephone line without disturbing the normal operation of the telephone — while at the same time allowing selective operation of the automatic dialing mechanism as desired. The sandwich block is formed with a wiring arrangement such that the telephone line will function normally and yet permit the selective utilization of the automatic dialing arrangement as desired.

In the accompanying drawing, which forms a part of this specification, there is shown a presently preferred embodiment of the invention, in which, FIG. 1 is a diagrammatic view showing a sandwich plug connecting a telephone and an automatic telephone dialer to a telephone outlet.

Figures 1, 5, 6:
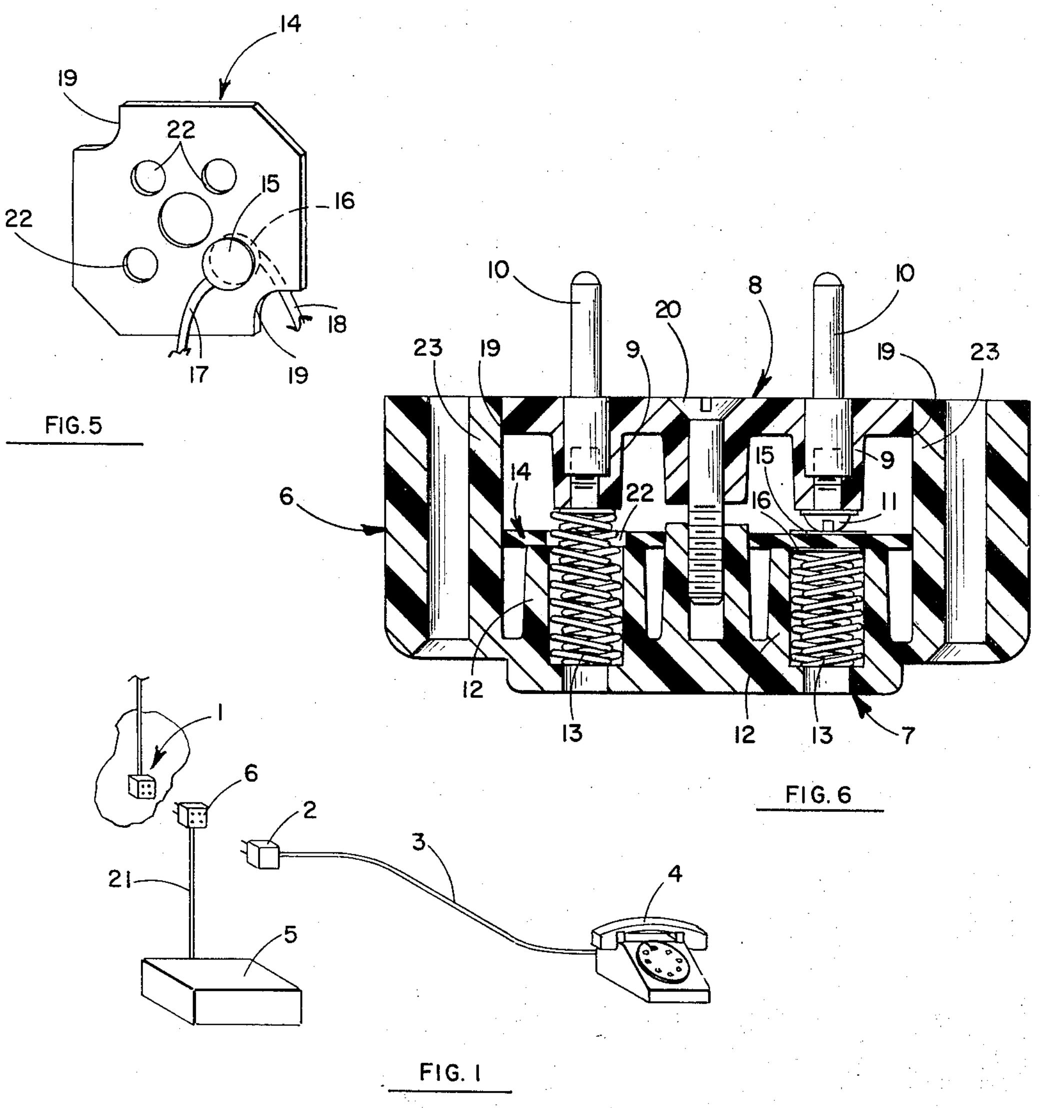
FIG. 5 is a plan view of the insert that is placed between the male and female parts of the plug.
FIG. 6 is a cross sectional view of the assembled plug with the insert in place, taken generally along line 6—6 of FIG. 2.

Referring now to the drawing, there is shown in FIG. 1 an incoming telephone line terminating in jack 1 of the type normally installed by the telephone company. This jack is adapted to receive plug 2 connected by wires 3 to a telephone 4 in the usual manner.

When it is desired to connect apparatus such as an automatic telephone dialer into the telephone line, a sandwich plug 6 connected by wires comprising line 21 to the dialer 5 is utilized according to the present invention. The sandwich plug 6 is basically a connector plug of the type used to connect two telephones to a single telephone jack of an incoming telephone line. Such a plug is well known in the art and will be described herein only with sufficient particularity to set forth the modification thereto that comprises the present invention.

Plugs 2 and 6 normally have four male prongs adapted to be received in corresponding connector openings in either jack 1 or plug 6 so that two telephone lines may be carried by the line, one for each pair of prongs and connector openings. Since only one pair of prongs and connector openings are used with a single telephone, the present invention will be described and illustrated for a single telephone, however, it is to be understood that the invention may be used for two telephone lines.

Figure 3:
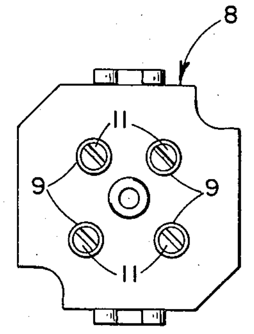
FIG. 3 is a view of the inner side of the male part of the plug.
Figure 4:
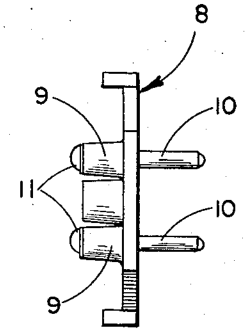
FIG. 4 is a side elevational view of part of the plug shown in FIG. 3.
Figure 2:
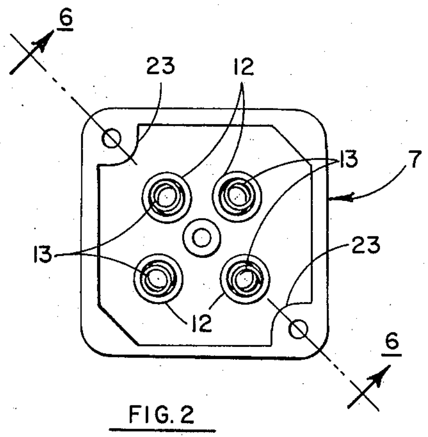
FIG. 2 is a view of the inner side of the female part of the plug.

The connector plug utilized in the present invention comprises a female part 7 (FIG. 2) and a male part 8 (FIG. 3). The male part 8 is composed of a plate member having cylindrical portions 9 for receiving contact pins 10 which are held in place by screws 11. Such screws are also used to connect conductor wires into the telephone line when so desired. The female part 7 includes cylindrical portions 12 for receiving contact springs 13 which rest against the ends of cylindrical portions 12 at one end and against screw heads 11 at the other end when the parts 7 and 8 are assembled.

In the normal use of the connector plug described above, and without utilizing the modification of applicant's invention, an additional telephone is connected into the telephone line by connecting wires therefrom to properly selected screw heads 11 to provide a parallel connection. However, such an arrangement will not function with auxiliary equipment such as an automatic telephone dialer which must be connected in series with the existing telephone line.

Since it is not possible to modify or change existing jacks and connectors furnished by the telephone company and it is desired to use as far as possible existing commercially available connector plugs, applicant has provided an adapter insert for modifying such existing connector plugs whereby auxiliary equipment requiring a series connection may be readily connected into the telephone line.

Referring now to FIG. 5, there is shown an adapter insert 14 comprised of insulating material such as plastic or the like and provided with signal contact portions 15 and 16 (FIG. 6) on opposite sides thereof. Conductor wires 17 and 18 are secured to the respective contact portions 15 and 16 and these wires comprise the line 21 shown in FIG. 1. In assembled position, contact 15 is adapted to engage a screw head 11 and contact 16 a contact spring 13 as shown in FIG. 6. Contacts 15 and 16 may comprise conductor material deposited on insert 14 utilizing printed circuit technique, or otherwise fastened thereto by mechanical or chemical means.

Insert 14 is provided with openings 22 at those locations where contact is desired between screw heads 11 and springs 13. It is to be understood that instead of selected openings such as 22, the portion of insert 14 between contacts that are to be left in engagement may be cut away in its entirety. Insert 14 is also provided with notches 19 interfitting with projections 23 for properly locating the insert in place.

Referring now to FIG. 6, the parts 7 and 8 of the connector plug are held together by screw 20 with all the corresponding contacts 11 and 13 in engagement except the two which engage contacts 15 and 16. Wires 17 and 18 from such respective contacts lead to and from auxiliary apparatus to connect the same into one of the wires of the telephone line.

In the utilization of the present invention, when it is desired to connect auxiliary equipment in series in a telephone line, using standard jacks and plugs authorized by the telephone company and commercially available connector plugs of the type described, it is only necessary to separate the two parts of such a connector plug, place applicant's adapter insert between the two parts of the plug and refasten the parts together. The wires leading from the adapter insert may then be connected to the auxiliary apparatus whereby such apparatus will be connected into one wire of the telephone line in series with the telephone line.

Applicant has provided in this invention, a reliable arrangement for converting a standard connector plug that normally is adapted to connect auxiliary equipment into a telephone line in a parallel relationship into a connector plug whereby auxiliary equipment may be connected into the telephone line in series connection.

What is claimed is:

1. A sandwich connector plug for connecting auxiliary equipment such as an automatic telephone dialer in series with the jack of a telephone line comprising:

a pair of readily separable mating parts, one of such parts having contact elements projecting therefrom for engaging said jack and the other of such parts having contact elements for receiving projecting contact elements from a telephone line plug, the inner ends of said contact elements being normally in engagement when assembled, an adapter insert between said mating parts for insulatingly separating the inner end of a selected contact element of said one part from its corresponding contact element of said other part with the inner ends of the remaining corresponding contact elements of said parts in contact, said adapter insert and one of said mating parts being provided with interfitting notch and projection means to locate said insert in place, and means for attaching a wire in conductive relationship with each of said separated contact elements, said wires being adapted to be connected to said auxiliary apparatus in series with one wire of said telephone line.

2. A sandwich connector plug for connecting auxiliary equipment such as an automatic telephone dialer in series with the jack of a telephone line comprising:

a pair of mating parts, one of such parts having contact elements projecting therefrom for engaging said jack and the other of such parts having contact elements for receiving projecting contact elements from a telephone line plug, the inner ends of said contact elements being normally in engagement when assembled, an adapter insert for insulatingly separating the inner end of a selected contact element of said one part from its corresponding contact element of said other part, and means for attaching a wire in conductive relationship with each of said separated contact elements comprising conductor elements attached to said insert on opposite sides thereof and in conductive relationship with their contact elements, said wires being adapted to be connected to said auxiliary apparatus in series with one wire of said telephone line.

3. A sandwich connector plug for connecting auxiliary equipment such as an automatic telephone dialer in series with the jack of a telephone line comprising:

a pair of mating parts, one of such parts having contact elements projecting therefrom for engaging said jack and the other of such parts having contact elements for receiving projecting contact elements from a telephone line plug, the inner ends of said contact elements being normally in engagement when assembled, an adapter insert for insulatingly separating the inner end of a selected contact element of said one part from its corresponding contact element of said other part, said insert being provided with openings for permitting contact between the inner ends of selected corresponding contact elements, and means for attaching a wire in conductive relationship with each of said separated contact elements, said wires being adapted to be connected to said auxiliary apparatus in series with one wire of said telephone line.

* * * * *